C. I. HALL.
THERMOSTATIC VALVE UNIT.
APPLICATION FILED MAR. 4, 1919.

1,337,907. Patented Apr. 20, 1920.

Inventor:
Chester I. Hall,
by Albert G. Davis
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

THERMOSTATIC-VALVE UNIT.

1,337,907.  Specification of Letters Patent.  Patented Apr. 20, 1920.

Application filed March 4, 1919. Serial No. 280,624.

*To all whom it may concern:*

Be it known that I, CHESTER I. HALL, a citizen of the United States, residing at Fort Wayne, county of Allen, State of Indiana, have invented certain new and useful Improvements in Thermostatic-Valve Units, of which the following is a specification.

The present invention relates to valves such as are used to control the flow of cooling liquid from the jacket of an internal-combustion engine to a radiator, and is intended more particularly for use in connection with automobiles and the like.

The object of my invention is to provide an improved thermostatic valve which is a self-contained unit of very simple structure; which can be manufactured at a low cost, and which can be very readily and quickly applied to any automobile without change of parts or the use of special tools.

For a consideration of what I believe to be novel and my invention, attention is directed to the accompanying description and the claims appended thereto.

Figure 1:
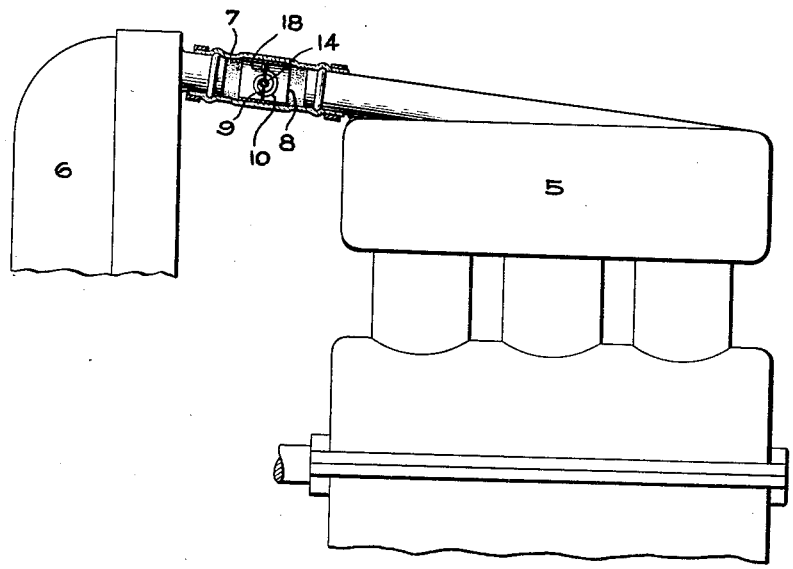
Figure 2:
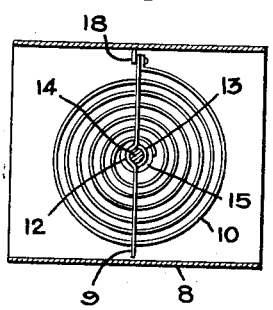

In the drawing, Figure 1 is a view showing my improved thermostatic valve installed in the connection between an engine and a radiator; Fig. 2 is a longitudinal view of the valve structure, and Fig. 3 is an end view thereof.

Referring to the drawing, 5 indicates an internal-combustion engine, 6 the upper portion of a radiator, and 7 the usual piece of flexible conduit or hose used to connect the jacket of the engine to the radiator for conveying cooling liquid.

Now, according to my invention, I provide a thermostatic valve structure comprising a casing 8 in the form of a short length of pipe adapted to be slipped inside the hose connection 7 and having inside it a valve 9 in the form of a flat disk, which valve is actuated by a thermostatic member 10. Casing 8 has an external diameter equal to or slightly greater than the internal diameter of hose 7 so that when inserted thereinto it makes a tight fit and will be firmly held. Valve 9 may be stamped from sheet material and is provided with a slot 11 which extends crosswise thereof and also a corrugation 12 which extends at right angles to slot 11, there being a punched up portion 13 adjacent each end of the corrugation to form straps. Located in corrugation 12 and held by straps 13 is a spindle 14, the ends of which are fixed in casing 8. Valve disk 9 is thus pivoted on spindle 14 and can turn thereon. At the center of spindle 14 is a hub 15 adapted to be locked to the spindle by a set screw 16 and the valve 9 is cut out as indicated at 17 to accommodate this hub. The thermostatic member 10 is in the form of a spiral spring made of thermostatic metal and extending through slot 11, the inner end being fastened to hub 15 and the outer end to valve 9. Hub 5 is wider than thermostatic member 10 extending to one side of it as shown in Fig. 3 so set screw 16 is readily accessible. Carried by casing 8 is a stop pin 18 against which the valve rests when it is closed.

Figure 3:
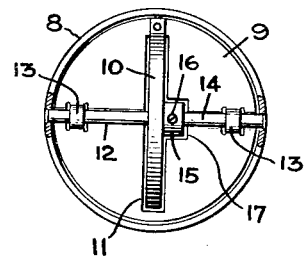

The thermostatic valve structure is made up as a unit as shown in Figs. 2 and 3 and the thermostatic member 10 is given an initial tension or setting so that it holds the valve closed and against stop pin 18 until a certain desired temperature is reached. This setting may be readily accomplished by loosening set screw 16 and turning hub 15 to coil or uncoil thermostatic member 10 as may be required. After the thermostatic member 10 is correctly set, the unit as a whole is inserted in a connection between the engine and the radiator. I preferably put the unit in the connection which leads cooling liquid from the engine to the radiator since by so doing it is actuated by the temperature of the liquid coming from the engine, and not by the temperature of the liquid after it has been cooled by passing through the radiator. Almost invariably the connection between the top of an engine jacket and the radiator is made by means of a flexible conduit or piece of hose and it is a comparatively simple matter to insert the unit therein. However, it could be easily inserted in a piece of pipe, if found desirable, and suitably fastened therein.

The arrangement is such that valve 9 when closed does not prevent all circulation of cooling medium but permits a small amount of circulation to take place. This is desirable in order that the thermostatic member 10 may be heated as the engine heats up in starting. In other words, there must be some circulation to bring cooling medium from the cylinder jacket to the thermostatic member. To this end valve 9 is made to fit loosely in casing 8 and the slot 11 may be made somewhat larger than is necessary to accommodate thermostatic member 10.

With the engine idle and the cooling medium cold, valve 9 will be closed. Now when the engine is started it will begin to heat the cooling medium in its jacket and since the circulation of cooling medium is limited to a very small amount, the cooling medium in the engine jacket will be heated up very quickly with the result that the engine will be quickly heated up. The initial circulation which takes place when valve 9 is closed is so small that the heating of the cooling medium surrounding the cylinder will be retarded but slightly. When the cooling medium in the engine jacket reaches the temperature at which it is desired to have valve 9 begin to open and for which the thermostatic member 10 is set, the valve will begin to open and as the temperature increases, the valve will be gradually opened until at a desired temperature it will be fully open. For example, the valve may be arranged to begin to open at about 120° F. and to be fully open at about 200° F., although as already stated the setting may be for any desired limits. In any event it is to be noted that the valve opens and closes gradually and since the thermostatic member 10 is located in the path of circulation and is acted upon directly by the cooling medium there will be no appreciable lag in the operation of the valve.

The valve may be used in connection with a circulating system employing a pump or with other types of circulating systems.

As will be readily appreciated, the foregoing structure as shown in Figs. 2 and 3 is a complete self-contained unit of few parts and simple in operation. It can be manufactured at relatively low cost and applied to a cooling system without change in any of the engine parts and with little labor.

Furthermore, it has just the mode of operation most to be desired for it is acted upon directly by cooling medium as it leaves the engine jacket, and opens and closes gradually.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with an engine having a jacket, a radiator and a hose connection between them, of a thermostatic valve structure inserted in said hose connection comprising a short length of pipe which forms a valve casing, a valve member arranged therein, and a thermostatic member connected to the valve member for opening and closing it.

2. The combination with an engine having a jacket, a radiator and a hose connection between them, of a thermostatic valve structure inserted in said hose connection comprising a short length of pipe which forms a valve casing, a disk journaled therein and forming a valve, and a thermostatic member connected to the disk for turning it.

3. The combination with an engine having a jacket, a radiator and a hose connection between them, of a thermostatic valve structure inserted in said hose connection comprising a short length of pipe which forms a valve casing, a shaft extending crosswise of the casing and fixed thereto, a disk mounted to turn on the shaft, and a thermostatic member having one end connected to the disk and the other to said shaft.

4. The combination with an engine having a jacket, a radiator, and a hose connection between them, of a self-contained thermostatic valve unit located in said hose connection and comprising a short cylinder open at its ends and forming a casing, a shaft therein, a valve mounted on the shaft, said valve having an opening through it, and a thermostatic member mounted in said opening and having one end fixed and the other end connected to the valve.

5. The combination with an engine having a jacket, a radiator, and a hose connection between them, of a self-contained thermostatic valve unit located in said hose connection and comprising a short cylinder open at its ends and forming a casing, a shaft therein, a valve mounted on the shaft, said valve having an opening through it, and a coiled thermostatic member mounted in said opening transversely of the valve and having one end fixed and the other end connected to the valve.

6. A self-contained thermostatic valve unit comprising a short pipe section open at its two ends and forming a casing, a shaft therein, a valve mounted on the shaft, said valve having an opening through it, and a thermostatic member mounted in said opening and having one end fixed and the other end connected to the valve.

7. A self-contained thermostatic valve unit comprising a short cylinder open at its ends and forming a casing, a shaft fixed therein, a disk rotatably mounted on the shaft, said disk having an opening through it, and a coiled thermostatic member mounted in said opening transversely of the disk and having one end connected to the valve and the other end to said shaft.

8. A self-contained thermostatic valve unit comprising a cylindrical casing, a shaft fixed therein, a valve on the shaft, a hub on the shaft, means for fastening the hub against turning, and a coiled thermostatic spring having one end connected to the valve and the other to the hub whereby said spring may be adjusted by turning the hub.

9. A self-contained thermostatic valve unit comprising a cylindrical casing, a shaft fixed thereon, a valve on the shaft, a hub on the shaft, means for fastening the hub against turning, a coiled thermostatic spring having one end connected to the valve and the other to the hub whereby said spring may be adjusted by turning the hub, and stop means for limiting the movement of the valve.

In witness whereof, I have hereunto set my hand this Feb. 28, 1919.

CHESTER I. HALL.